United States Patent [19]
Koga

[11] Patent Number: 5,213,822
[45] Date of Patent: May 25, 1993

[54] INJECTION STRETCH BLOW MOLDING APPARATUS

[75] Inventor: Kouhei Koga, Ueda, Japan

[73] Assignee: Nissei ASB Machine Co., Ltd., Nagano, Japan

[21] Appl. No.: 806,226

[22] Filed: Dec. 13, 1991

Related U.S. Application Data

[62] Division of Ser. No. 559,266, Jul. 27, 1990, Pat. No. 5,102,610.

[30] Foreign Application Priority Data

Jul. 31, 1989 [JP] Japan ................................ 1-198510
Jul. 31, 1989 [JP] Japan ................................ 1-198519

[51] Int. Cl.⁵ ............................................. B29C 49/30
[52] U.S. Cl. ................................... 425/522; 425/526; 425/529; 425/533; 425/534
[58] Field of Search ............... 425/534, 529, 533, 522, 425/526; 264/532, 537, 538, 535

[56] References Cited

U.S. PATENT DOCUMENTS

| | | | |
|---|---|---|---|
| 3,979,491 | 9/1976 | Zavasnik | 264/538 |
| 4,151,247 | 4/1979 | Hafele | 425/534 X |
| 4,209,290 | 6/1980 | Rees et al. | 425/534 X |
| 4,357,296 | 11/1982 | Hafele | 264/532 |
| 4,422,843 | 12/1983 | Aoki | 425/525 |
| 4,427,359 | 1/1984 | Fukuoka et al. | 425/525 |
| 4,437,825 | 3/1984 | Harry et al. | 425/534 X |
| 4,529,372 | 7/1985 | Saumsiegle | 425/534 X |
| 4,604,258 | 8/1986 | Valyi | 264/537 |
| 4,797,084 | 1/1989 | Nakamura et al. | 425/534 X |
| 4,895,509 | 1/1990 | Giacobbe | 425/534 X |

FOREIGN PATENT DOCUMENTS 0300549 1/1989 European Pat. Off. .
1424069 11/1965 France .
53-22096 7/1978 Japan .
57-093125 6/1982 Japan ................................ 264/537
64-40316 2/1989 Japan .

OTHER PUBLICATIONS

Patent Abstracts of Japan, vol. 8, No. 197 (M-324) [1634] Sep. 11, 1984.

Primary Examiner—Richard L. Chiesa
Attorney, Agent, or Firm—Oliff & Berridge

[57] ABSTRACT

An injection stretch blow molding apparatus performs a cycle of molding steps by circulating a plurality of neck mold sets for holding the neck portions of preforms. In a first portion of the operating sequence, a neck mold used in the injection molding stage to mold a preform, is conveyed from one end of a horizontal path of movement for conveying said neck mold to the stretch blow molding stage disposed at the other end of the horizontal path of movement. In a second portion of the operation sequence a neck mold, from which a blow molded product has been ejected in the ejection stage, offset vertically from the middle of the horizontal path of movement, is returned back to the injection molding stage, which is empty, through a vertical path of movement connecting the horizontal path of movement with the ejection stage and through the horizontal path of movement, after the first portion of the operating sequence has started. In a third portion of the operating sequence a neck mold, holding a container blow molded in the stretch blow molding stage, is conveyed to the ejection stage, which is empty, through the horizontal and vertical paths of movement after the second portion of the operating sequence has started. The entire system can be reduced in size, with the span between the tie rods being minimized and with the space of installation being reduced, even if a container having an increased bore diameter is to be molded in this system.

14 Claims, 14 Drawing Sheets

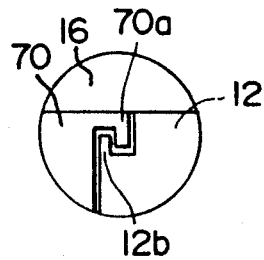
FIG. 3(D)
FIG. 3(A)
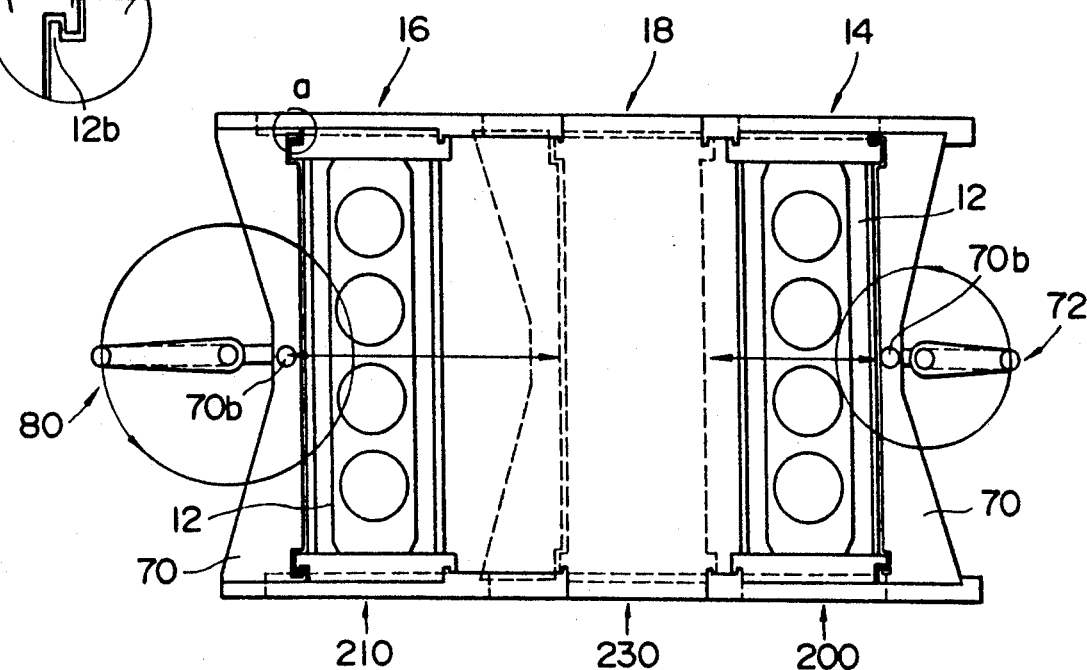
FIG. 3(B)
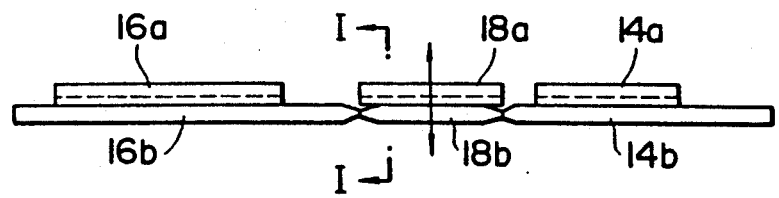
FIG. 3(C)
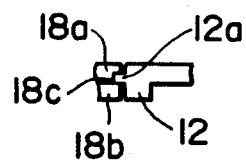

INJECTION STRETCH BLOW MOLDING APPARATUS

This is a division of application Ser. No. 07/559,266 filed Jul. 27, 1990, now U.S. Pat. No. 5,102,610.

BACKGROUND OF THE INVENTION

1. Field of the Invention

The present invention relates to injection stretch blow molding process and apparatus which can continuously make a cycle of molding steps by moving a neck mold while it holds a preform, and particularly to an improved system for conveying the neck mold.

2. Description of the Related Art

Systems for moving the neck mold through a plurality of stages realizing a cycle of molding steps are disclosed in Japanese Patent Publication No. 22096/1978 and Japanese Laid-Open Patent Application No. 40316/1989.

Patent Publication 22096/1978 discloses a system comprising a circular rotary member and four neck molds on the rotary member. The four neck molds are disposed opposite to the respective one of four stages, that is, injection molding stage, heating stage, stretch blow molding stage and ejection stage, all of which are located around the rotary member. When the rotary member is intermittently rotated, each of the neck molds will be sequentially moved through the four stages.

Laid-Open Patent Application 40316/1989 discloses a system similar to the system disclosed in Patent Publication 22096/1978, except that it comprises a first path along which each of the neck molds is conveyed sequentially through the respective one of various stages for realizing the injection stretch blow molding process, and a second path formed parallel to the first path and used to return each of the neck molds from the final molding stage in one cycle to the first path. The neck molds are conveyed through the two paths by conveyor means which comprises an actuator for slidably moving each of the neck molds from one stage to the next stage, means for transferring the neck mold between the first and second paths and another actuator for returning the neck mold from the second path back to the first path.

The two prior art techniques are common to each other in that all the neck molds are circulated through a loop defined by the first and second paths. However, these prior art techniques raise the following problems when they are applied directly to an injection stretch blow molding process of forming preforms with increased bore diameters.

In order to mold preforms having increased bore diameters, increasing the bore diameter of the neck molds used therein and also increasing a distance between each adjacent neck molds longitudinally spaced apart from each other cannot be avoided when a plurality of preforms are simultaneously format one stage. Therefore, increasing span between tie rods used to guide a clamping mechanism in the vertical movement thereof cannot be avoided.

In the construction disclosed in the Patent Publication 22096/1978, the tie rods must be located at such a position that they will not interfere with various parts rotated by the rotary member. If the span between the tie rods is increased for the above purpose, the use of a clamping mechanism having a clamping force equal to several hundreds tons for molding performs having an increased bore diameter must be designed to have a sufficient strength to resist a bending moment produced therein. This results in increase of the size of the entire molding system.

On the other hand, the construction disclosed in Laid-Open Patent Application 40316/1989 can maintain a minimum span between a minimum tie rods even if the bore diameter in preforms to be molded is increased, because each of the neck molds is slidably moved at an injection molding stage. However, such a construction must separately have the additional or second path for returning the neck molds back to their original position, other than the first path for conveying the neck molds through the injection stretch blow molding process. This also results in increase of the size of the entire molding system.

SUMMARY OF THE INVENTION

It is therefore an object of the present invention to provide an injection stretch blow molding process and apparatus which can utilize a novel configuration of conveyance of neck mold means for realizing a cycle of injection stretch blow molding to minimize the span between the tie rods for supporting the clamping mechanism, to maintain the minimum size of the entire system and yet to decrease an area on which the system is installed, even if preforms having increased bore diameter are to be formed.

To this end, the present invention provides an injection stretch blow molding process of performing a cycle of molding steps by circulating a plurality of neck mold sets for holding the neck portion of at least one preform sequentially at least through an injection molding stage, a stretch blow molding stage and an ejecting stage, said process being characterized by the steps of: first conveying a neck mold, by which a preform has been molded in said injection molding stage, disposed at one end of a horizontal path of movement for conveying said neck mold to said stretch blow molding stage disposed at the other end of said horizontal path of movement;

secondly returning a neck mold, from which a slow molded product has been ejected in the ejection stage, offset vertically from the middle of said horizontal path of movement and back to said injection molding stage which is empty through a vertical path of movement connecting said horizontal path of movement with said ejection stage and said horizontal path of movement, after the first mentioned step has been started; and thirdly conveying a neck mold holding a container blow molded in the stretch blow molding, stage, to said ejection stage which is empty through said horizontal and vertical paths of movement after the second mentioned step has been started.

Since the injection molding stage is provided at one end of the horizontal path of movement, a set of neck molds can be horizontally moved linearly into and out of the injection molding stage. Thus, even if a preform to be molded has an increased bore diameter, the span between the tie rods can be minimized in comparison with the rotary conveyance system. By adding the vertical path of movement, the entire path of conveyance will not be formed into a loop. Thus, the cycle of molding operations can be repeatedly realized by conveying the neck molds sequentially through the empty stages.

In accordance with the present invention, an additional stage for conveying the neck mold along the vertical path of movement, for example, such as temperature adjustment state, retraction stage or the like may be provided at a position on the opposite side of the horizontal path of movement to the ejection stage.

The apparatus of the present invention comprises a horizontal path of movement for horizontally moving said neck molds between said injection molding stage and said stretch blow molding stage; and a vertical path of movement for transferring said neck molds between said horizontal path and said vertical path.

By moving a set of neck molds which have been completed with respect to the preceding step to any stage in which no neck mold is present, the other set of neck molds can be conveyed by one step.

The apparatus of the present invention does not use a loop-shaped path of conveyance for the neck molds although the linear movement of neck mold to the injection molding stage is realized. In comparison with a system including two parallel paths of movement each having a linear length corresponding to one cycle as in Laid-Open Patent Application 40316/1989, the present invention can provides a greatly reduced area in which the entire system is installed. If the apparatus includes four stages, two of which are disposed spaced vertically from each other, there is only required a area in which substantially three stages can be provided. Only three sets of neck molds to be circulated may be provided for the four stages Therefore, the cost of manufacturing the apparatus of the present invention can be reduced by the decreased number of the neck molds, in comparison with the prior art which essentially required four sets of neck molds.

If there is any stage having no neck mold, a set of neck molds in which the preceding step has completed can be moved to that empty stage. That is, a set of neck molds can be moved to any empty stage independently of the other neck mold sets. In the prior art, all the neck molds could not independently be moved until the injection molding step normally requiring the longest time period had been terminated, because the respective sets of neck molds were intermittently moved in synchronism with one another. If each set of neck molds can be moved independently, the set of neck molds will not be required to be placed in its standby position through the long time period required in the preform molding step as by moving that set of neck molds directly from the temperature adjustment stage to the blow molding stage without waiting completion of the preform molding step.

The horizontal path of movement for the neck molds may be preferably defined by the first slide rail located in the injection molding stage, the second slide rail provided in the blow molding stage and two third slide rails disposed spaced vertically away from each other between the first and second slide rails for vertical movement. In such an arrangement, the third slide rails forming part of the horizontal path of movement can be utilized also as a vertical path of movement. Driving members in a frame for moving the neck molds may be first and second frame driving members which can engage such a neck mold moving frame so as to reciprocate along the first and second slide rails. A neck mold moving frame mounted on the third slide rails through the first and second frame driving members can be disengaged by the first and second frame driving members through the vertical movement of the third slide rails and then transported to the retraction stage or the temperature adjustment stage. If the third slide rails are established at the same level as those of the first and second slide rails, the third slide rails can be engaged by the frame driving member on either of the first or second slide rail to be horizontally moved to the other stage. If required in the injection or blow molding step, the first and second slide rails may be vertically moveable at that stage independently of each other.

BRIEF DESCRIPTION OF THE DRAWINGS

FIG. 3A is a schematic plan view of the mechanism for horizontally moving the neck mold moving frame.

FIG. 3B is a front view of the mechanism shown in FIG. 3A.

FIG. 3C is a cross-sectional view of the mechanism, taken along a line I—I in FIG. 3B.

FIG. 3D is an enlarged view of a portion of FIG. 3A.

DETAILED DESCRIPTION OF THE PREFERRED EMBODIMENTS

The present invention will now be described in conjunction with some embodiments thereof and with reference to the drawings.

First Embodiment

Figure 10A:
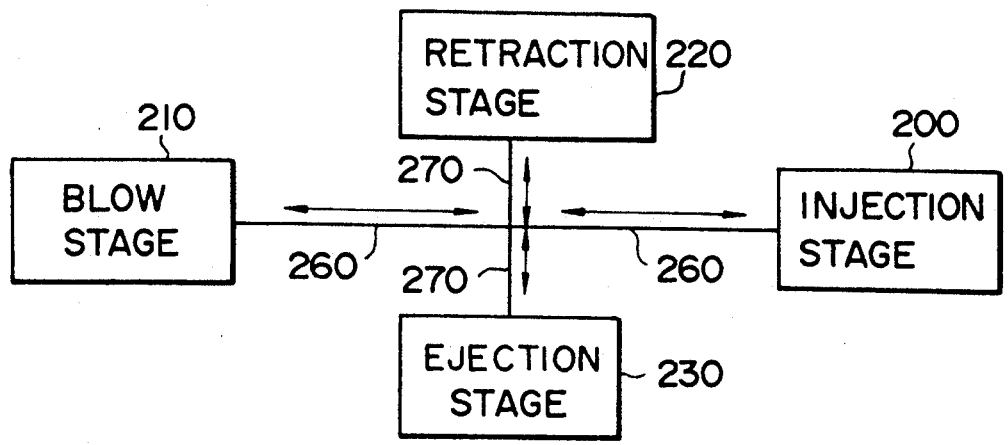
FIGS. 10A through 10C schematically illustrate various different forms of the injection stretch blow molding apparatus to which the present invention is applied.

Referring first to FIG. 10A, the apparatus constructed in accordance with the first embodiment of the present invention comprises four stages, that is, an injection molding stage 200 and a stretch blow molding stage 210 (hereinafter called merely "blow molding stage") respectively at the opposite ends of a horizontal path of movement 260 for neck molds, and a retraction stage 220 and an ejection stage 230 respectively placed at the upper and lower positions spaced apart from the middle of the horizontal path 260. Neck molds can be transferred between the retraction and ejection stages 220, 230 through a vertical path of movement 270.

Figure 1:
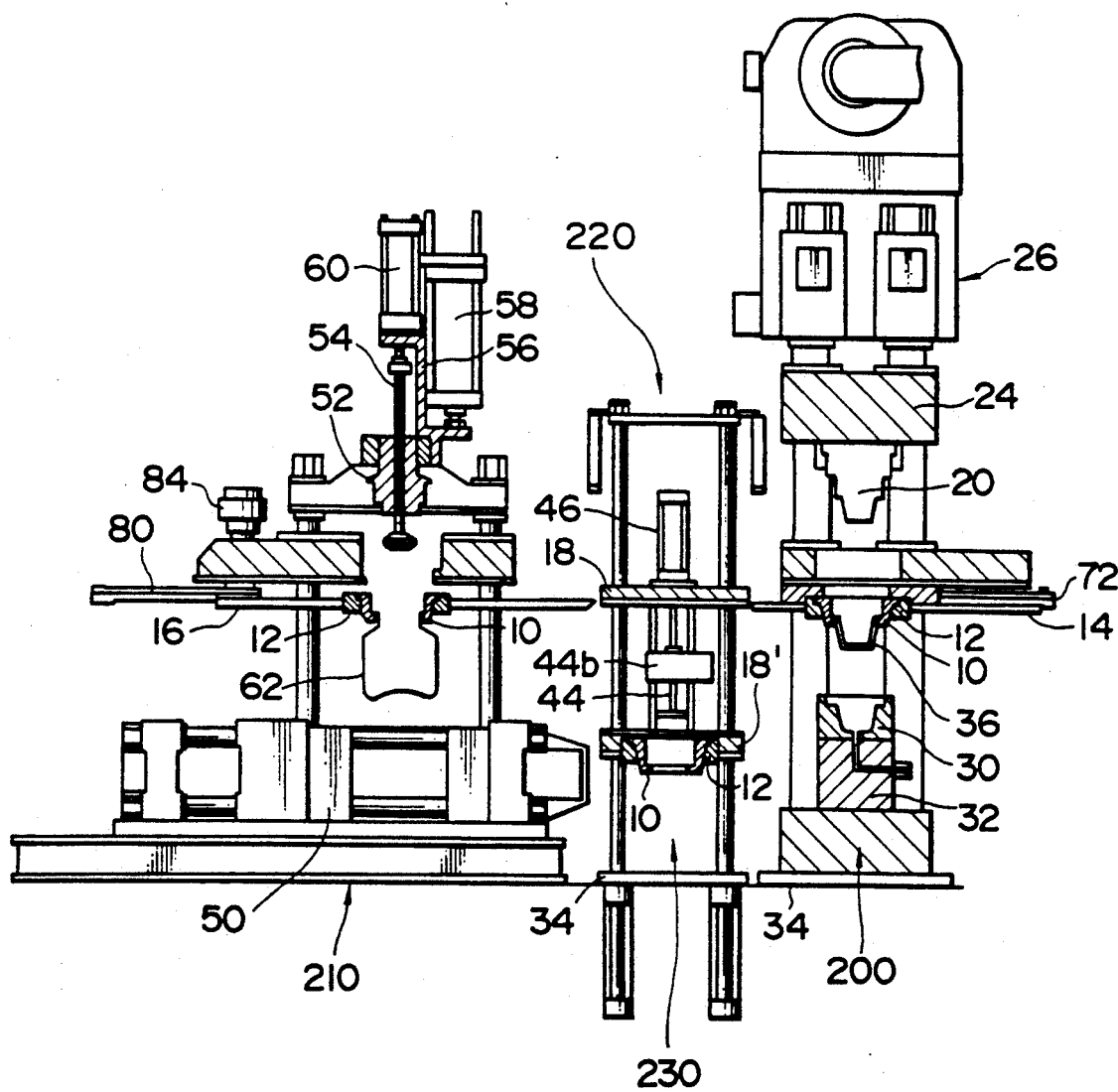
FIG. 1 is a schematically cross-sectional view of a first embodiment of an injection stretch blow molding apparatus constructed in accordance with the present invention.
Figure 2B:
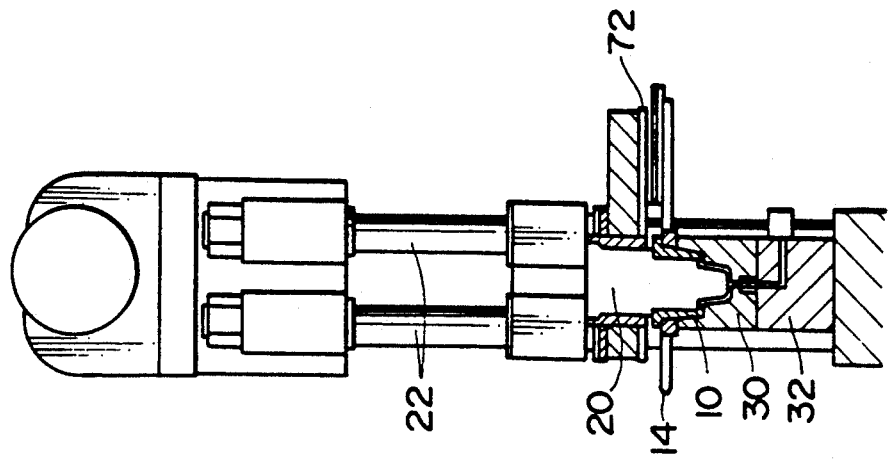
FIG. 2B is a schematically longitudinal cross-section of the injection molding means.
Figure 2A:
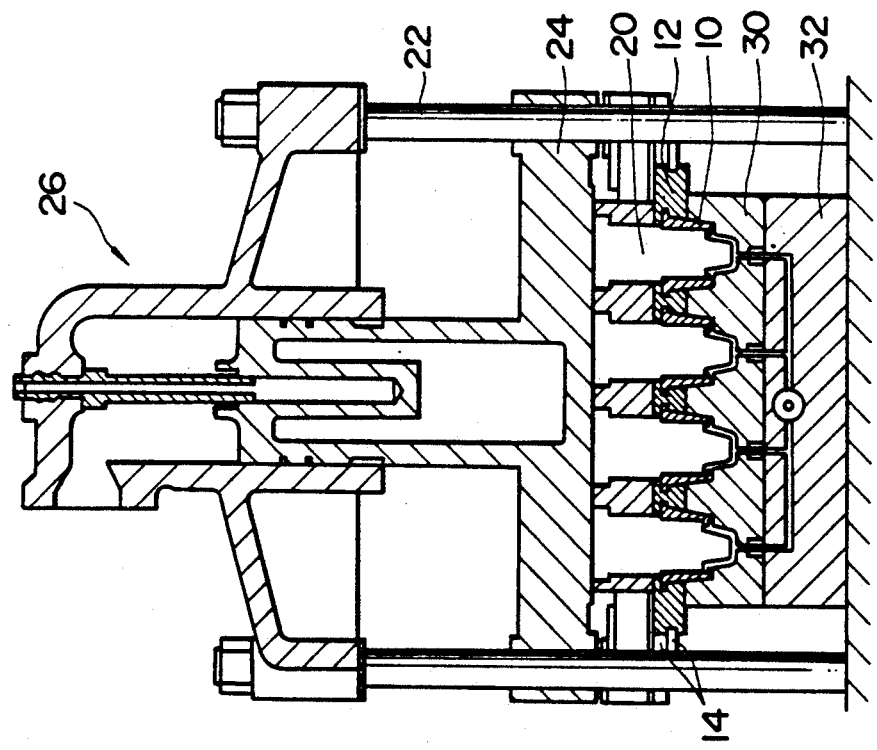
FIG. 2A is a schematically transverse cross-section of the injection molding means for molding preforms.

The injection molding stage 200 will now be described in more detail with reference to FIGS. 1 and 2.

Each of neck molds 10 is operably supported on a neck mold moving frame 12 through a neck mold fixing plate (not shown). The neck mold moving frame 12 fixedly supports a set of four neck molds 10. However the number of neck molds in one set is not limited to four. The neck mold moving frame 12 is supported on a first slide rail 14 which is vertically moveable through a drive mechanism (not shown), as will be described in detail later.

A core mold 20 is disposed above each of the neck molds 10 at a position opposed thereto. The core mold 20 is fixedly mounted on a moveable clamping plate 24 which is vertically moveable relative to tie rods 22. The core mold 20 can be moved vertically by a clamping device 26.

Below each of the neck molds 10, there is a base 34 on which a cavity mold 30 and a hot runner mold 32 are fixedly mounted. The core and neck molds 20, 10 are moved into the interior of the cavity mold 30 to form a mold cavity by means of the clamping mechanism 26. A preform 36 will be molded by injecting a body of resin material into the mold cavity as through screw type injection means.

Figure 4A:
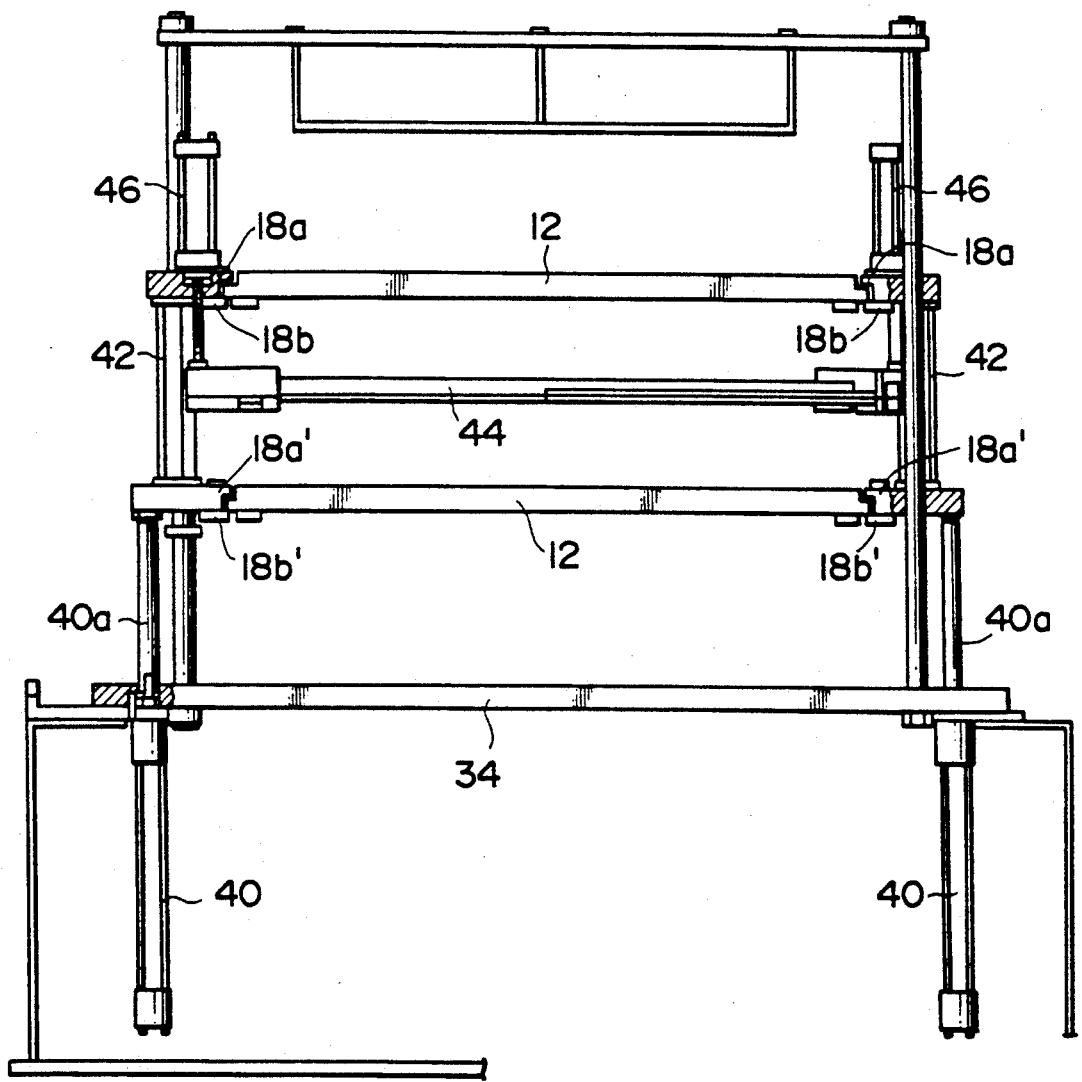
FIG. 4A is a schematic front view of the mechanism for vertically moving the neck mold moving frame.
Figure 4B:
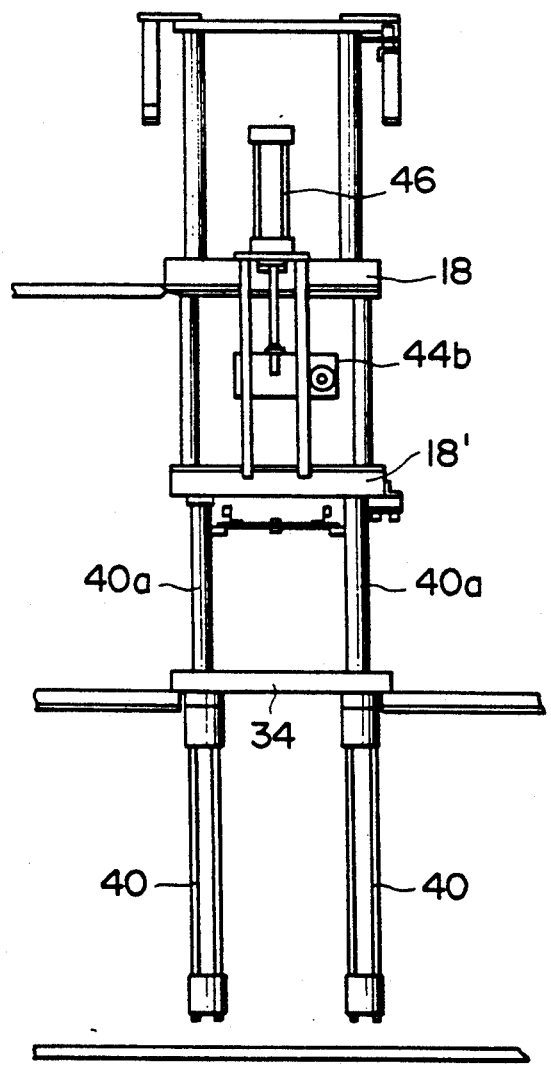
FIG. 4B is a side view of the mechanism shown in FIG. 4A.

Turning also to FIG. 4, the retraction and ejection stages 220, 230 and described.

In this area, the neck mold moving frame 12 can be supported by two third slide rails 18 and 18' which are spaced vertically apart from each other, as will be described in detail. The upper third slide rail 18 is moveable between the horizontal path 260 connecting the injection molding stage 200 with the blow molding stage 210 and the retraction stage 220 located above the horizontal path 260. On the other hand, the lower third slide rail 18' is moveable between the horizontal path 260 and the ejection stage 230 located below the horizontal path 260. The upper and lower third slide rails 18, 18' are driven by piston-cylinder means 40 each of which is mounted on the base 34 and has a piston rod 40a fixedly connected with the lower third slide rail 18'. Spacer rods 42 are fixedly mounted between the upper and lower third slide rails 18, 18'. When the piston-cylinder means 40 are energized, the upper and lower third slide rails 18, 18' will be vertically moved as a unit. An ejection core 44 is further supported between the third slide rails 18 and 18'. After the lower third slide rail 18' has been set at the ejection stage 230, the ejection core 44 can co-operate with neck mold opening cam means (not shown) to open the corresponding neck mold 10 and also to eject a molding 62. The ejection core 44 is actuated through a plate 44b which may be driven by ejection piston-cylinder means 46 on the upper third slide rail 18.

The blow molding stage 210 will now be described in more detail with reference to FIG. 1.

In this blow molding stage 210, the neck mold moving frame 12 is supported on the second slide rail 16 which will be described in detail. A blow mold 50 is disposed below the neck molds 10 while a blow core 52 and a stretch rod 54 are disposed above the neck mold 10. The blow core 52 is mounted on a blow core unit moving frame 56 and moveable in the vertical direction by means of piston-cylinder means 58 for the blow core unit. The blow core unit moving frame 56 is provided with piston-cylinder means 60 for the stretch rod, which can move the stretch rod 54 in the vertical direction independently of the blow core 52. After the second slide rail 16, blow core 52 and stretch rod 54 have been moved downwardly as a unit through piston-cylinder means (not shown), the piston-cylinder means 58 for the blow core unit is then actuated to move the blow core 52 and stretch rod 54 into the blow mold 50. After the blow mold 50 has been closed, the stretch rod 54 is moved inwardly and the blowing step is initiated to form a hollow product 62 which is expanded radially and axially.

The apparatus constructed according to the illustrated embodiment comprises four stages whereas three sets of neck mold moving frames 12, which is one less than the number of stages, are disposed in the apparatus. After the preceding step has been terminated at any one of the neck mold moving frames 12, the latter is moved into a subsequent stage in which no neck mold moving frame 12 is present. Thus, the remaining frames 12 can be moved by one step.

Mechanism for moving the neck mold moving frames 12 will now be described with reference to FIG. 3.

Each of the first, second and third slide rails 14, 16 and 18 for horizontally moving and guiding the neck mold moving frames 12 consists of an upper rail section 14a, 16a or 18a and a lower rail section 14b, 16b or 18b. As shown in FIG. 3C, a guide groove 18c is formed between the upper and lower rail sections 18a and 18b in the third slide rail 18. On the other hand, each of the neck mold moving frames 12 includes projections 12a laterally extending from the opposite side edges thereof. These projections 12a are engageable in the guide groove 18c. Guide grooves 14c and 16c (not shown) similar to the guide groove 18c are also formed in the first and second slide rails 14 and 16. These guide grooves 14c, 16c and 18c are disposed such that when a neck mold moving frame 12 is to be conveyed, the projections 12a in that neck mold moving frame 12 are inserted from the preceding guide groove to the trailing guide groove before the neck mold moving frame 12 is separated from the preceding groove. The lower third guide rail 18' also includes a similar groove 18c' (not shown) formed therein. By engagement of the projections 12a with the respective guide grooves 14c, 16c, 18c and 18c', each of the neck mold moving frames 12 can be moved and guided only in the horizontal direction while being positioned relative to the vertical direction. When each of the slide rails 14, 16, 18 and 18' is moved vertically, the corresponding neck mold moving frame 12 will also be moved vertically together with the associated guide rail.

Transfer of the neck mold moving frame 12 between each adjacent slide rails will now be described.

Each of the first and second slide rails 14 and 16 is provided with a frame driving plate 70 guided to the corresponding guide groove 14c or 16c. As shown by FIG. 3D which is an enlarged view of section a in FIG. 3A, key sections 70a are formed in each of the frame driving frames 70 at the opposite side edges thereof. On the other hand, similar key sections 12b are formed in each of the neck mold moving frames 12 at the four corners thereof. As shown in FIG. 3D, the key sections 70a and 12b are engaged with each other such that the neck mold moving frame 12 can be freely moved vertically relative to the frame driving plates 70 while being horizontally moveable together with the frame driving plates 70.

Mechanism for driving the frame driving plates 70 is described below.

Figure 5:
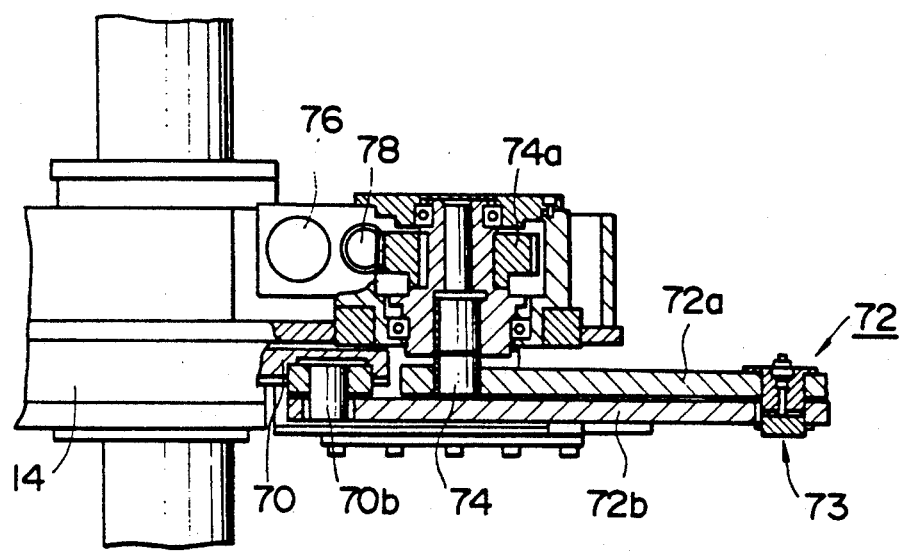
FIG. 5 is a schematic cross-section of the drive section in the linkage on the side of the injection molding stage.

A mechanism for driving the frame driving plate 70 on the side of the injection molding stage 200 is described with reference to FIG. 5. This mechanism is provided by a linkage mechanism 72 which comprises first and second links 72a and 72b all of which are pivotally supported about a pivot pin 73. The first link 72a is a drive link fixedly mounted at one end on a rotating shaft 74 while the second link 72b is a driven link rotatably mounted at one end on the pivot pin 70b in the frame driving plate 70. The rotary shaft 74 may be driven by a rack and pinion mechanism which comprises a rack 78 and a pinion 74a. The rack 78 is driven horizontally by piston-cylinder means 76 and engaged by the pinion 74a which is fixedly mounted on the rotary shaft 74. By using such a rack and pinion mechanism, the linkage mechanism 72 can be actuated within a relatively small space. When the first and second links 72a and 72b overlap each other, the neck mold moving frame 12 will be set in the injection molding stage 200. If the first and second links 72a and 72b are positioned on a linear line without overlapping, the neck mold moving frame 12 will be transferred to the third slide rail 18 or 18'.

Figure 6:
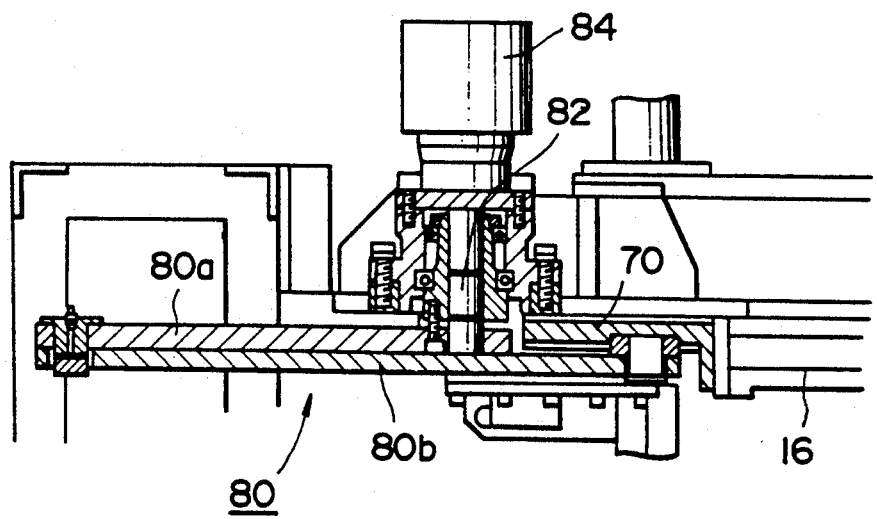
FIG. 6 is a schematic cross-section of the drive section of the linkage on the side of the blow molding stage.

A mechanism for driving the frame driving plate 70 in the blow molding stage 210 is described also with reference to FIG. 6.

A linkage mechanism 80 for driving the frame driving plate 70 similarly consists of first and second links 80a, 80b. This linkage mechanism 80 is different from the linkage mechanism 72 in that the linkage mechanism 80 has a larger stroke of movement than that of the linkage 72 and in that the first link 80a in the linkage mechanism 80 is mounted on a rotary shaft 82 which is an output shaft in a hydraulic rotary actuator 84. The hydraulic rotary actuator 84 is advantageous in that its construction is simpler than that of the rack and pinion mechanism. Further, the rotary actuator 84 may be used since the blow molding stage 210 has an increased space of installation.

The operation of the aforementioned apparatus and particularly the operation of conveying the neck mold moving frame 12 for performing one cycle of the injection stretch blow molding process will now be described with reference to FIG. 7.

The procedure of conveyance for the neck mold moving frame, 12 may be divided broadly into three steps. However, the first step is further sub-divided into two sections, that is, the first half section and the second half section. This is because the apparatus of the first embodiment includes a retraction stage 220, although the first step is to convey the neck mold moving frame 12 from the injection molding stage 200 to the blow molding stage 210.

① First Half of First Step:
Conveyance of the neck mold moving frame from the injection molding stage 200 to the retraction stage 220.

② Second Step:
Conveyance of the frame from the ejection stage 230 to the injection stage 200.

③ Third Step:
Conveyance of the frame from the blow stage 210 to the ejection stage 230.

④ Second Half of First Step:
Conveyance of the frame from the retraction stage 220 to the blow molding stage 210.

However, this embodiment provides various steps overlapped in timing.

Figure 7A:
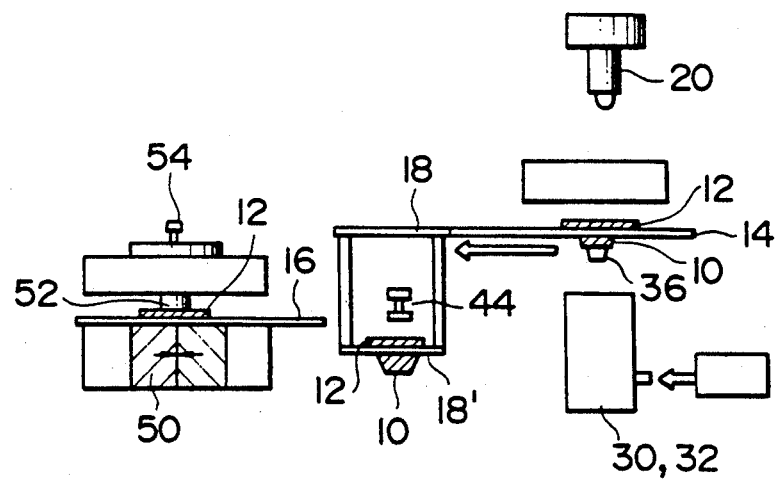
FIGS. 7A through 7G illustrate various successive steps performed in the apparatus according to the first embodiment of the present invention.

FIG. 7A —Start of the first half section in the first step

In such a state, the injection molding stage 200 is in a position that a preform 36 has been just injection molded; the ejection stage 230 is in a position that a blow molded product 62 has been just ejected therefrom; and the blow molding stage 210 is in a position that a blow molding step is being performed. At the same time, only the retraction stage 220 has no neck mold moving frame 12. Any neck mold moving frame 12 wherein the molding of the perform 36 has been completed can be moved into the retraction stage 220. On this conveyance, the neck mold moving frame 12 will be first moved to the upper third slide rail 18 above the first slide rail 14 since the upper third slide rail 18 is flush with the first slide rail 14 supporting this neck mold moving frame 12. To this end, the first link 72a in the linkage mechanism 72 is rotated 180° to set the first and second links 72a and 72b on a straight line without overlapping. At this time, the neck mold moving frame 12 will be moved onto the upper third slide rail 18 along the guide groove 14c of the first slide rail 14 by the linkage mechanism 72 through the frame driving plates 70, because the key sections 70a of the frame driving plates 70 are engaged by the key sections 12b of the neck mold moving frame 12. The linkage mechanism 72 serves as means for averaging the speed of movement in the neck mold moving frame 12 through one cycle and for easily positioning the neck mold moving frame 12. The neck mold moving frame 12 has the maximum speed when the first link 72a is rotated about 90 and the minimum speed when the first link 72a is rotated about 180°.

Figure 7B:
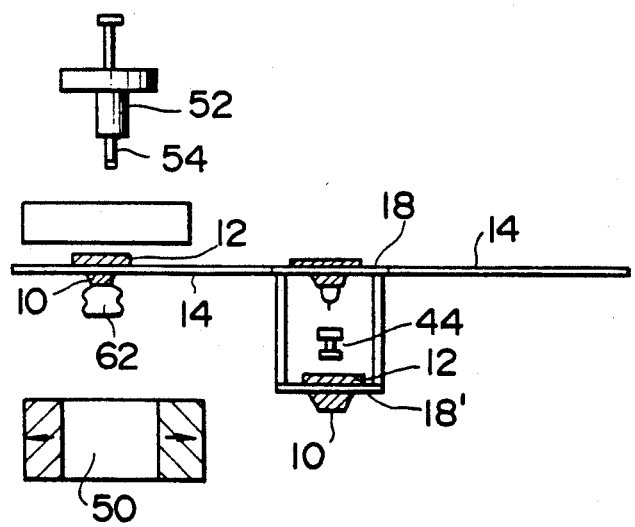

FIG. 7B —Start of the second step

In such a state, a neck mold moving frame 12 wherein a preform has been molded is set on the upper third slide rail 18 while a preform has been molded in the blow molding stage 210. In this blow molding stage 210, the neck mold moving frame 12 holding a neck mold 10 which supports a molding 62 is placed on the same plane as that of the upper third slide rails 18. Since the injection molding stage 200 becomes empty, the second step can be started by upwardly moving the third slide rails 18 and 18'.

Figure 7C:
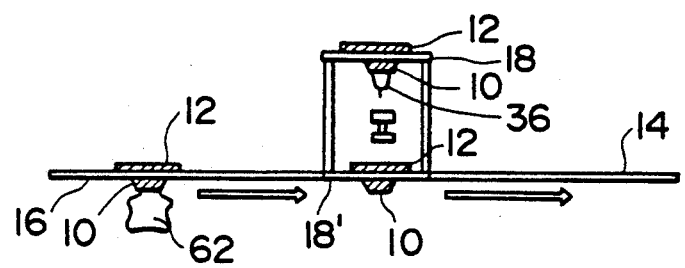

FIG. 7C —End of First Step First Half and Start of Third Step

In such a state, the upper third slide rail 18 supporting a neck mold moving frame 12 wherein a preform has been just molded is placed in the retraction stage 220 (end of the first half of the first step) while the lower third slide rail 18' supporting a neck mold moving frame 12 from which a molding has been just ejected is placed on the same plane as those of the first and second slide rails 14 and 16. This can be realized by actuating the piston-cylinder means 40 to perform the upward movement of the upper and lower third slide rails 18 and 18' as a unit. At this time, the upper third slide rail 18 is engaged by the frame driving plates 70 through the key sections 12b and 70a. Since the upper third slide rail 18 is freely moveable in the vertical direction, the upward movement of this slide rail 18 will not be obstructed at all. When the lower third slide rail 18' is place in the above position, the frame driving plates 70 are engaged by the key sections 12b and 70a. Since the ejection stage 230 is empty, the third step can be started.

Figure 7D:
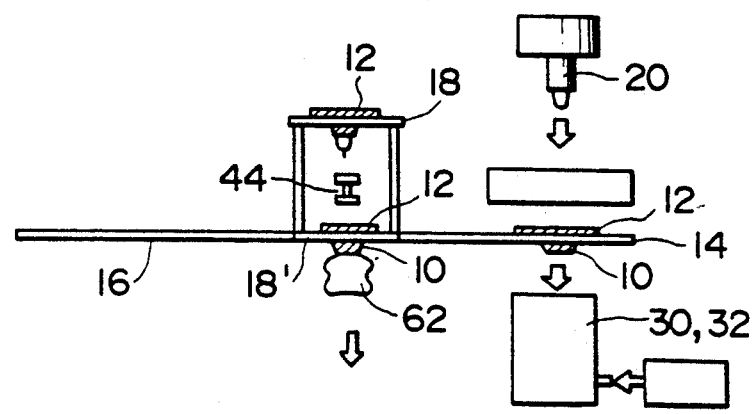

FIG. 7D —End of Second Step and Start of First Step First Half

In such a state, a neck mold moving frame 12 from which a slow molded product has been just ejected is horizontally moved into the injection molding stage 200 (end of the second step) and a neck mold moving frame 12 in which a preform has been just blow molded is placed on the lower third slide rail 18'. The horizontal movement of the neck mold moving frame from which a blow molded product has been just ejected can be realized by rotating the first link 72a of the linkage mechanism 72 through 180°. On the other hand, the movement of the neck mold moving frame 12 in which a preform has been just blow molded can be realized by rotating the first link 80a of the linkage mechanism 80 through the linkage 180°. Since the blow molding stage 210 becomes empty, the second half section of the first step can be initiated.

Figure 7E:
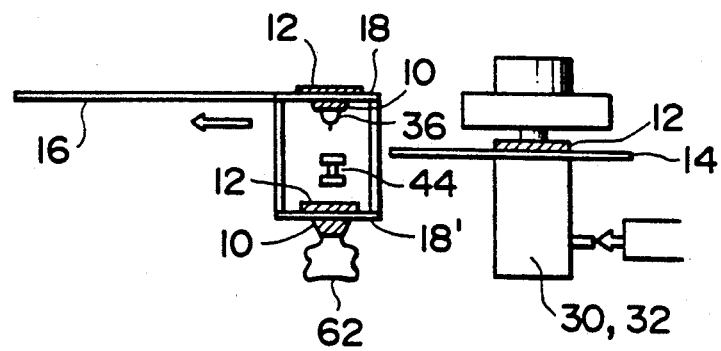

FIG. 7E —End of Third Step

In such a state, the injection molding stage 200 initiates to injection mold a preform 36 under the action of the clamping device 26 and so on. On the other hand, the upper and lower third slide rails 18 and 18' are downwardly moved as a unit and the upper third slide rail 18 is placed on the same plane as that of the second slide rail 16. Thus, a neck mold moving frame 12 supporting a preform 36 can be conveyed to the blow molding stage 210. On the other hand, a neck mold moving frame 12 supported by the the lower third slide rail 18' is placed in the ejection stage 230 (End of the third step). It becomes possible to eject the blow molded product from this neck mold moving frame 12.

Figure 7F:
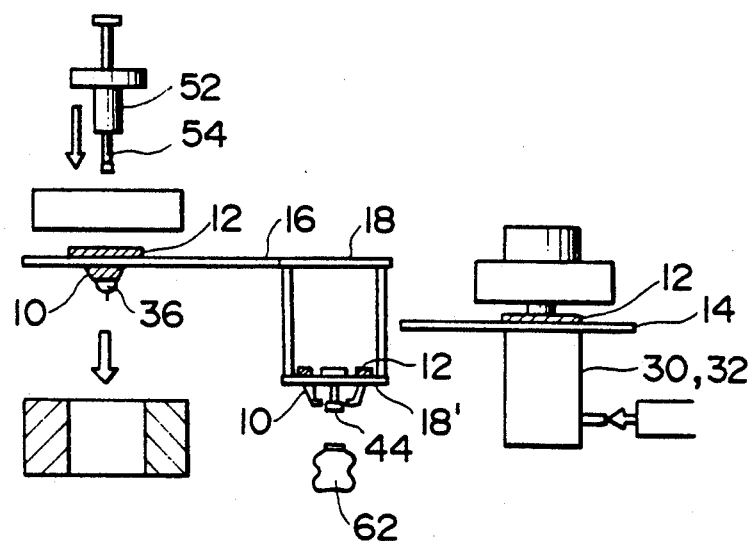
Figure 7G:
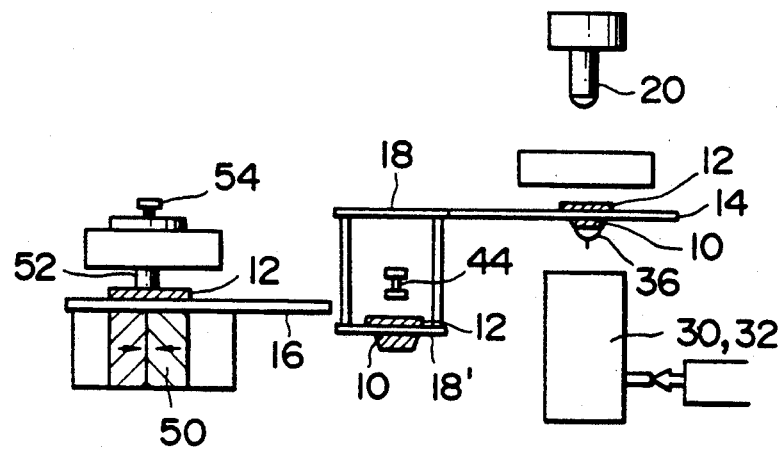

FIG. 7F —End of First Step Second Half

In such a state, the injection molding stage 200 continues to injection-mold a preform 36. On the other hand, the eject core 44 is driven relative to a neck mold moving frame 12 supported by the corresponding lower third slide rail 18' in the ejection stage 230 to eject a blow molded product therefrom. Further, a neck mold moving frame 12 supporting a preform 36 is moved from the upper third slide rail 18 to the second slide rail 16 (end of the first half in the first step). This conveyance can be realized by rotating the first link 80a of the linkage mechanism 80 through 180°.

FIG. 7G

This state is the same as that of FIG. 7A except that the second injection molding step has been just finished. In other words, the injection molding stage 200 has a neck mold moving frame 12 in which a preform 36 has been just molded and which is placed on the same plane as that of the upper third slide rail 18. On the other hand, the blow molding stage 210 initiates a blow molding step. When the neck mold moving frame 12 in the blow molding stage 210 is set on the lower third slide rail 18' as shown in FIGS. 7B, 7C and 7D and thereafter an ejecting operation is performed as shown in FIGS. 7E and 7F, one cycle of the injection stretch blow molding process will be completed.

Second Embodiment

Figure 10B:
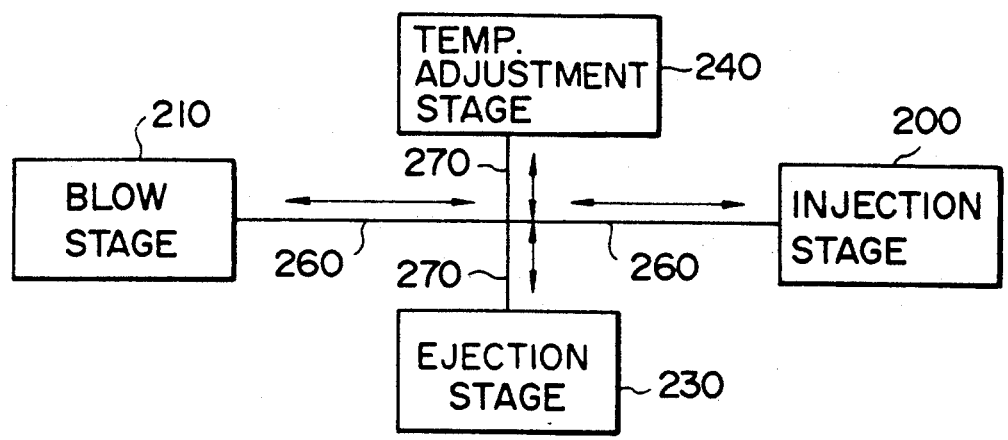

As shown in FIG. 10B, this second embodiment utilizes a temperature adjustment stage 24 in place of the retraction stage 220 in the first embodiment.

In order to adjust the temperature of a preform 36, the apparatus constructed according to the second embodiment comprises a modified drive mechanism (see FIG. 8) for the upper and lower third slide rails 18 and 18' as in the first embodiment and means for realizing the adjustment of temperature.

Figure 8:
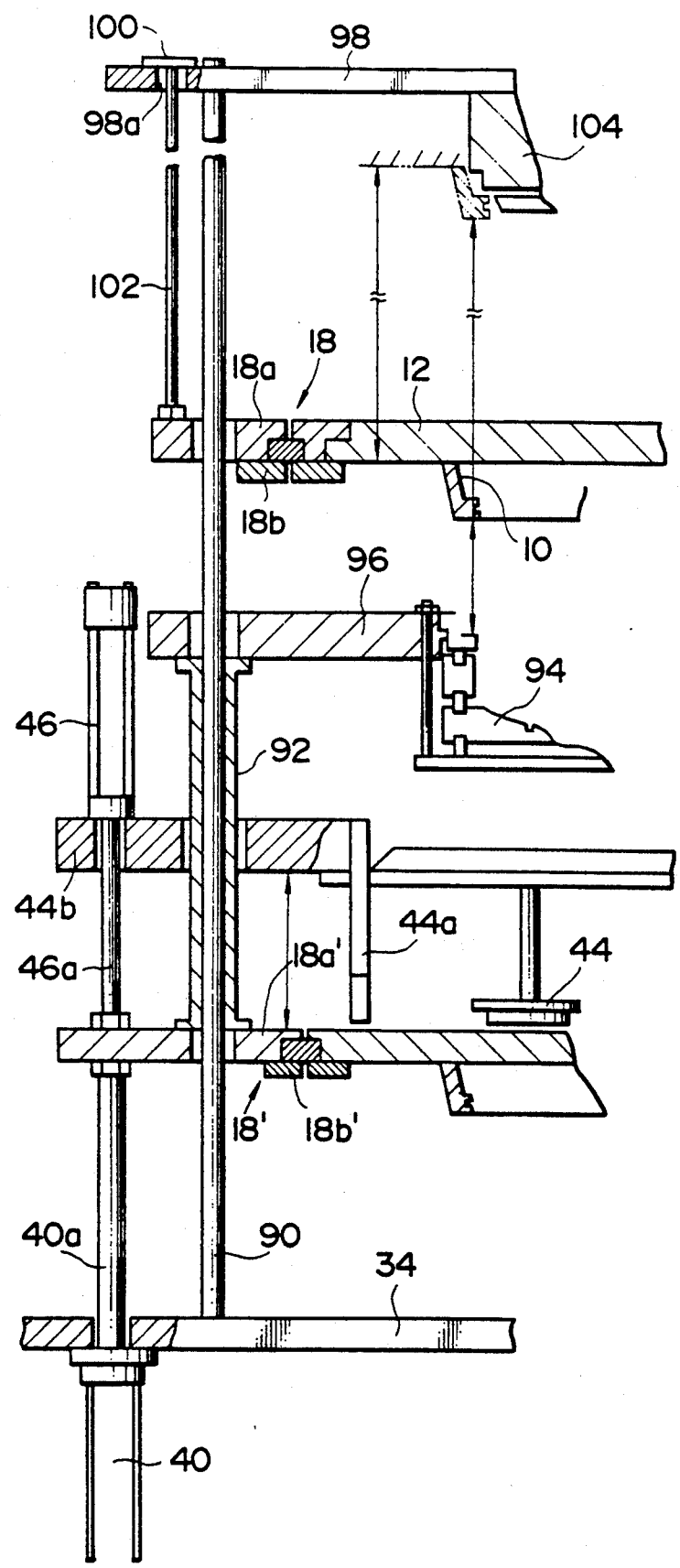
FIG. 8 is a schematic cross-section of the mechanism for vertically moving the neck mold moving frame used in the apparatus constructed according to the second embodiment of the present invention.
Figure 9A:
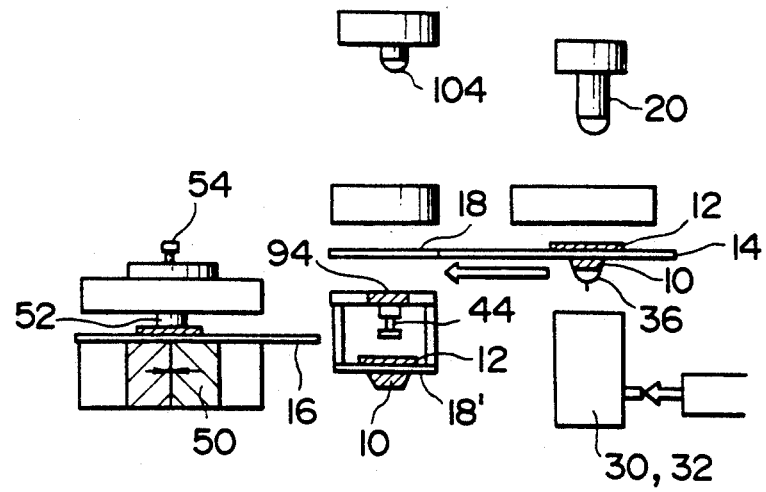
FIGS. 9A through 9G illustrate various successive steps performed in the apparatus of the second embodiment of the present invention.
Figure 9B:
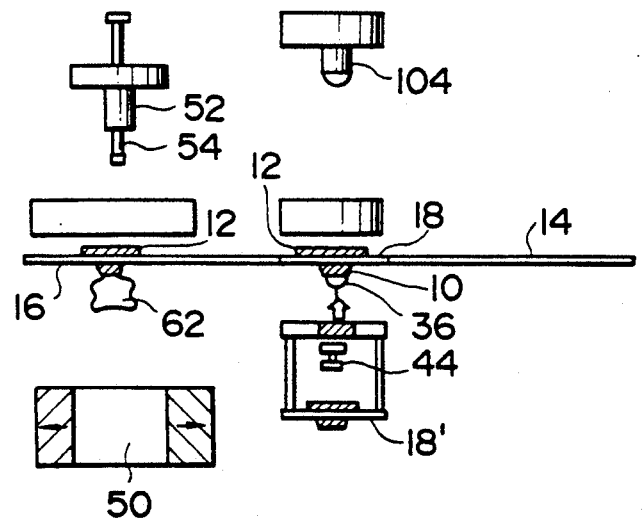
Figure 9C:
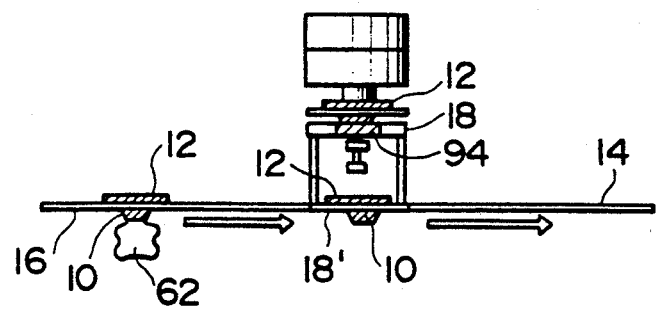
Figure 9D:
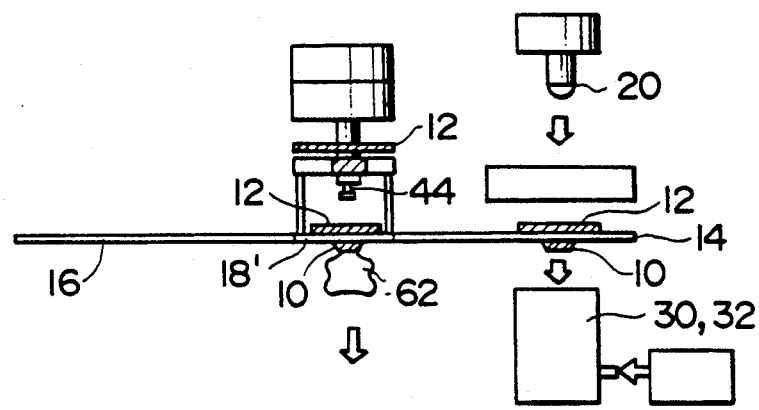
Figure 9E:
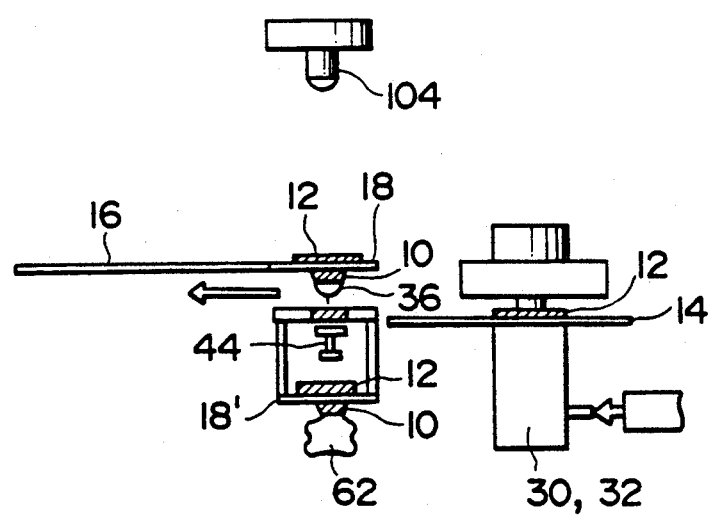
Figure 9F:
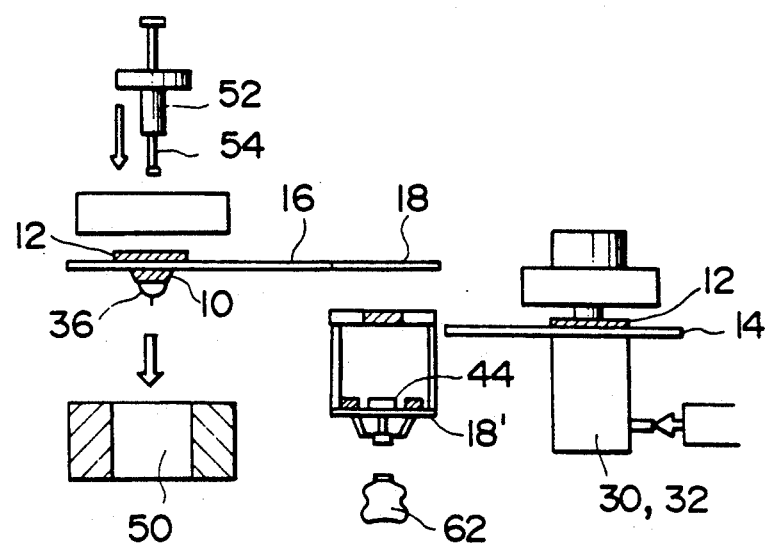
Figure 9G:
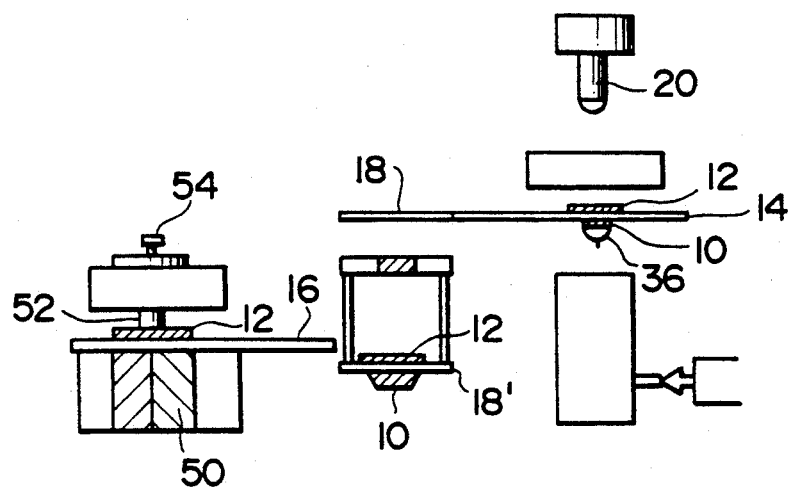

The arrangement shown in FIG. 8 is similar to that of the first embodiment in that the lower third slide rail 18' is driven through the piston-cylinder means 40, except the following points:

Vertically and upwardly from the base 34, there extend four guide shafts 90 (only one shown herein), each of which also extends through a sleeve-like spacer 92. Each of the spacers 92 is fixedly mounted, at the bottom end thereof, on the lower third slide rail 18'. The top end of the spacer 92 is rigidly secured to the underside of a plate 96 supporting a heating pot 94 which is adapted to heat a preform 36. On the other hand, the upper third slide rail 18 is moveably suspended from a top plate 98 which is fixedly mounted on the top ends of the guide shafts 90. More particularly, a stopper shaft 102 is fixedly mounted, at the bottom end thereof, on each corner of the upper third slide rail 18 and extends through the corresponding aperture 98a in the top plate 98. Each of the stopper shafts 102 includes a flange 100 formed thereon at the top end, this flange having an external diameter larger than the internal diameter of the corresponding aperture 98a. When the flanges 100 of the stopper shafts 102 engage the top face of the top plate 98, the upper third slide rail 18 is limited to its further downward movement Thus, the upper third slide rail 18 can be moved vertically in the range of movement limited between the top and bottom ends of the stopper shafts 102. The top plate 98 includes a heating core 104 disposed thereon at a position in the underside thereof substantially opposed to the heating pot 94. A preform 36 can be heated by clamping the associated neck mold 10 between the heating core and pot 104, 94. This can be accomplished by actuating the piston-cylinder means 40 for driving the rails in the vertical direction. More particularly, the heating pot supporting plate 96 will be moved upwardly together with the lower third slide rail 18' when the latter is driven upwardly. On the middle of upward movement, the heating pot 94 is engaged by the neck mold 10. As the plate 96 is further moved upwardly, the heating pot 94 will move the neck mold 10, the associated neck mold moving frame 12 and the upper third slide rail 18 as a unit in the upward direction to a position at which the heating core 104 is placed.

On the other hand, each of the ejection piston-cylinder means 46 for driving the ejecting core 44 is supported with the piston rod 46a thereof being rigidly mounted on the lower third slide rail 18'. The cylinder body of each of the piston-cylinder means 46 is moveably connected to the plate 44b on which neck mold opening cam means 44a is fixedly mounted. The ejection cores 44 as well as the neck mold opening cam means 44a are driven through the plate 44b.

The movement of each of the neck mold moving frames 12 in the temperature adjustment stage 240 is performed in such a manner as shown in FIG. 9. The steps shown in FIG. 9 are different from those shown in FIG. 7 in the following respects: Preforms 36 are heated in the temperature adjustment stage 240. Secondly, the upper third slide rail 18 is vertically moved through the movement of the heating pot 94 during the vertical movement of the lower third slide rail 18', rather than the unitary movement with the lower third slide rail 18'. Finally, the lower limit of the upper third slide rail 18 is defined by the stopper shafts 102 with the flanges 100. In such an arrangement, there is ensured a space in which the ejection core 44 as well as the heating pot 94 can be mounted, between the upper and lower third slide rails 18 and 18'.

Although the apparatus constructed according to the second embodiment has four stages all of which are required to perform the injection stretch blow molding process, a space required to provide only three stages may be required when the temperature adjustment and ejection stages 240 and 230 are disposed on the vertically opposite sides of the main path.

The present invention is not limited to the aforementioned embodiments thereof illustrated and described hereinbefore and may be applied in various modified configurations and arrangements without departing from the scope and spirit of the invention.

Figure 10C:
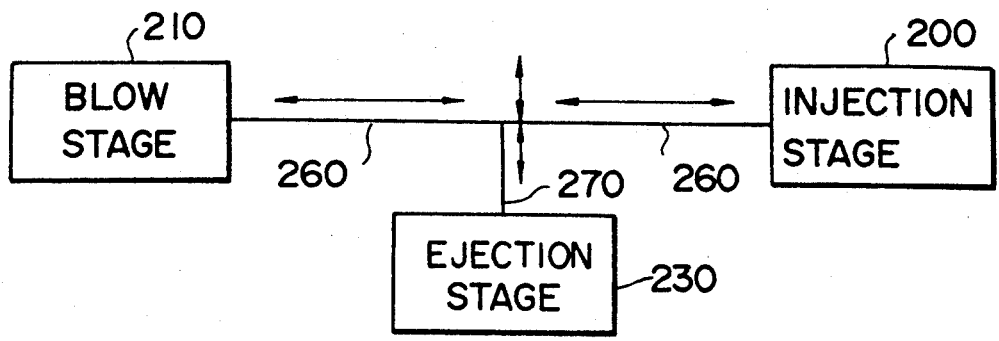

For example, the present invention can be applied to such an injection stretch blow molding system as shown in FIG. 10C. Such a system is fully similar to those of the aforementioned embodiments of the present invention, except that only an ejection stage 230 is located at a position offset vertically from the middle of the horizontal path 260 which connects between the injection molding stage 200 and the blow molding stage 210. This requires two sets of neck mold moving frames 12.

I claim:

1. An injection stretch blow molding apparatus providing a cycle of molding steps by circulating a plurality of neck molds for holding the neck portion of at least one preform sequentially at least through an injection molding stage, a stretch blow molding stage and an ejecting stage, comprising:
    means for moving each neck mold in a horizontal path between said injection molding stage and said stretch blow molding stage;
    means for transferring each neck mold in a vertical path between said horizontal path and said ejection stage, said ejection stage begin disposed at a position offset vertically from said horizontal path;
    whereby a neck mold in which a step has been completed in the preceding stage can be moved to a next stage wherein no neck mold is present while other neck molds can be conveyed sequentially to other stages.

2. An injection stretch blow molding apparatus as defined in claim 1, further comprising a temperature adjustment stage disposed at a position opposed to said ejection stage in a direction transverse to said horizontal path.

3. An injection stretch blow molding apparatus as defined in claim 2 wherein three neck molds are moveably provided for four stages including the injection molding stage, the temperature adjustment stage, the stretch blow molding stage and the ejection stage.

4. An injection stretch blow molding apparatus as defined in claim 1 wherein a retraction stage into which the neck mold can be retracted from said horizontal path is disposed at a position opposed to said ejection stage about said horizontal path.

5. An injection stretch blow molding apparatus as defined in claim 4 wherein three sets of neck molds are moveably provided for four stages including the injection molding stage, the retraction stage, the stretch blow molding stage and the ejection stage.

6. An injection stretch blow molding apparatus as defined in claim 1 wherein two sets of neck molds are moveably provided for three stages including the injection molding stage, the stretch blow molding stage and the ejection stage.

7. An injection stretch blow molding apparatus as defined in claim 1, further comprising:
    a plurality of neck mold moving frames each for holding one of the neck molds;
    first and second slide rails disposed in said injection molding stage and said stretch blow molding stage, each of the first and second slide rails being positioned to slidably guide said neck mold moving frames only in the horizontal direction;
    third upper and lower slide rails forming part of said horizontal path between said first and second slide rails, said third slide rails being positioned to slidably guide said neck mold moving frames only in the horizontal direction, means for moving said third slide rails vertically between a position at which the third lower slide rail is aligned with said first and second slide rails and a position at which said ejection stage is located;
    first and second frame driving members slidably supported respectively on said first and second slide rails, said first and second frame driving members being engageable with said neck mold moving frames to move together in the horizontal direction and releasable from said neck mold moving frames by the vertical movement of said upper and lower third slide rails; and
    first and second reciprocating and driving means for reciprocating and driving said first and second frame driving members.

8. An injection stretch blow molding apparatus as defined in claim 7 wherein said ejection stage is positioned below said horizontal path and further comprising a temperature adjustment stage located above sad horizontal path and wherein the transferring means moves a neck mold moving frame in which a preform has been molded in the injection molding stage to said temperature adjustment stage by upwardly moving said upper third slide rail to the position of said temperature adjustment stage.

9. An injection stretch blow molding apparatus as defined in claim 8 wherein said temperature adjustment stage includes temperature adjusting means comprising a temperature adjusting core positioned to be inserted into the interior of a preform and a temperature adjusting pot positioned to surround the preform, means fixedly mounting said temperature adjusting core in the temperature adjustment stage, means mounting said temperature adjusting pot on the lower third slide rail for vertical movement below the upper third slide rail, means for movably supporting the upper third slide rail between a limit of movement and the temperature adjusting core, and means for moving said upper third slide rail upwardly adjacent said temperature adjusting core when the lower third slide rail is moved upwardly.

10. An injection stretch blow molding apparatus as defined in claim 8 wherein said ejection stage is positioned below said horizontal path and said temperature adjustment stage is positioned above said horizontal path and whereby a neck mold moving frame in which a preform has been molded in the injection molding stage is set in said temperature adjustment stage by upwardly moving said upper third slide rail to the position of said temperature adjustment stage.

11. An injection stretch blow molding apparatus as defined in claim 7 wherein the injection molding stage includes means for moving said first slide rail vertically together with said neck molding moving frame.

12. An injection stretch blow molding apparatus as defined in claim 7 wherein said blow molding stage includes means for moving said second slide rail vertically together with said neck mold moving frame.

13. An injection stretch blow molding apparatus as defined in claim 7 wherein each of said first and second driving means comprises a first link means for rotatably connecting a first end of the first link with a corresponding one of said frame driving members, a second link, means for rotatably connecting a first end of each second link with a second end of said first link, a rotary shaft and means for drivingly connecting the shaft with a second end of each second link, whereby when the first and second links are overlapped, a neck mold moving frame can be moved onto the first or second slide rail, and when the first and second links are aligned with each other on a straight line without overlapping, the neck mold moving frame can be moved onto one of said upper and lower third slide rails.

14. An injection stretch blow molding apparatus as in claim 1, wherein the ejection stage is positioned between the injection molding stage and the blow molding stage.

* * * * *